US011039233B2

(12) United States Patent
Vansickel et al.

(10) Patent No.: US 11,039,233 B2
(45) Date of Patent: Jun. 15, 2021

(54) SOUND BAR WITH VARIOUS COUPLINGS

(71) Applicant: Audio Accessories Group, LLC, Tempe, AZ (US)

(72) Inventors: Larry Vansickel, Phoenix, AZ (US); Wang Hai, Ningbo (CN); Gu Wendong, Ningbo (CN); Zhou Liang, Ningbo (CN); Wang Youcai, Ningbo (CN)

( * ) Notice: Subject to any disclaimer, the term of this patent is extended or adjusted under 35 U.S.C. 154(b) by 71 days.

(21) Appl. No.: 16/443,715

(22) Filed: Jun. 17, 2019

(65) Prior Publication Data
US 2020/0396526 A1    Dec. 17, 2020

(51) Int. Cl.
| H04R 1/02 | (2006.01) |
| F21V 33/00 | (2006.01) |
| H04R 1/28 | (2006.01) |
| H04R 1/24 | (2006.01) |
| G06F 3/16 | (2006.01) |
| F21Y 115/10 | (2016.01) |

(52) U.S. Cl.
CPC ......... *H04R 1/026* (2013.01); *F21V 33/0056* (2013.01); *G06F 3/165* (2013.01); *H04R 1/023* (2013.01); *H04R 1/025* (2013.01); *H04R 1/24* (2013.01); *H04R 1/2834* (2013.01); *F21Y 2115/10* (2016.08); *H04R 2201/025* (2013.01)

(58) Field of Classification Search
CPC ........ H04R 1/026; H04R 1/025; H04R 1/023; H04R 1/24; H04R 2201/025; F21V 33/0056; G06F 3/165; F21Y 2115/10
See application file for complete search history.

(56) References Cited

U.S. PATENT DOCUMENTS

| D756,961 | S | 5/2016 | White et al. |
| D756,962 | S | 5/2016 | White et al. |
| D756,963 | S | 5/2016 | White et al. |
| D756,964 | S | 5/2016 | White et al. |
| D757,687 | S | 5/2016 | White et al. |
| 9,469,254 | B1 | 10/2016 | White et al. |
| 2018/0359593 | A1* | 12/2018 | Goller ...................... H04R 5/02 |

* cited by examiner

*Primary Examiner* — Regina N Holder
(74) *Attorney, Agent, or Firm* — Keith L. Jenkins, Registered Patent Attorney, LLC; Keith L. Jenkins (57) ABSTRACT

A sound bar system has couplings adaptable to irregular mounting challenges. An arcuate panel extends from a top edge of a front rectangular frame to a rear edge of a bottom rectangular frame. The arcuate panel has a plurality of parallel sets of three unique slots for receiving corresponding three-legged nuts for attaching clamps or similar connectors having 360° of rotational freedom. Single-legged sliders, each with a threaded rod extension, may also be used in one slot of said three unique slots. End brackets with 360° of rotational freedom and adjustable extension support the sound bar by the arcuate panel, not the end panels. More than one set of slots may be used in a single installation.

17 Claims, 13 Drawing Sheets

SOUND BAR WITH VARIOUS COUPLINGS

RELATIONSHIP TO OTHER APPLICATIONS

None.

FIELD OF ART

The present invention relates to sound bars with various couplings. The present invention more particularly relates to a non-linear arrangement of speakers with a plurality of optional couplings providing improved flexibility in mounting.

BACKGROUND OF THE INVENTION

Sound bars are used to provide a plurality of audio speakers in a linear arrangement for installation on vehicles, particularly for outdoor applications such as handle bars, tow frames for boats, and the like. Conventional sound bars usually mount to either a flat surface or to symmetrically opposed pipes, such as handle bars or tow frames. A sound bar capable of mounting to non-symmetrical environmental features is needed.

SUMMARY OF THE INVENTION

The present invention provides a non-linear arrangement of speakers in a sound bar enclosure that has generally flat front and bottom frames and an arcuate rear portion that connects the top of the front frame and the rear edge of the bottom frame. The arcuate portion has a plurality of sets parallel mutually unique spaced-apart slots, each parallel slot in each set having one of three unique slot cross sections for slidingly receiving corresponding three-legged nuts configured for receiving attachment screws. Adjustable end brackets with 360° of rotational freedom are secured in slots with screws, avoiding attachment of the end bracket to the end panels. Single-legged sliders with transverse threaded rods use one slot at a time. In a particular installation, multiple sets of slots may be used with couplings having various orientations.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
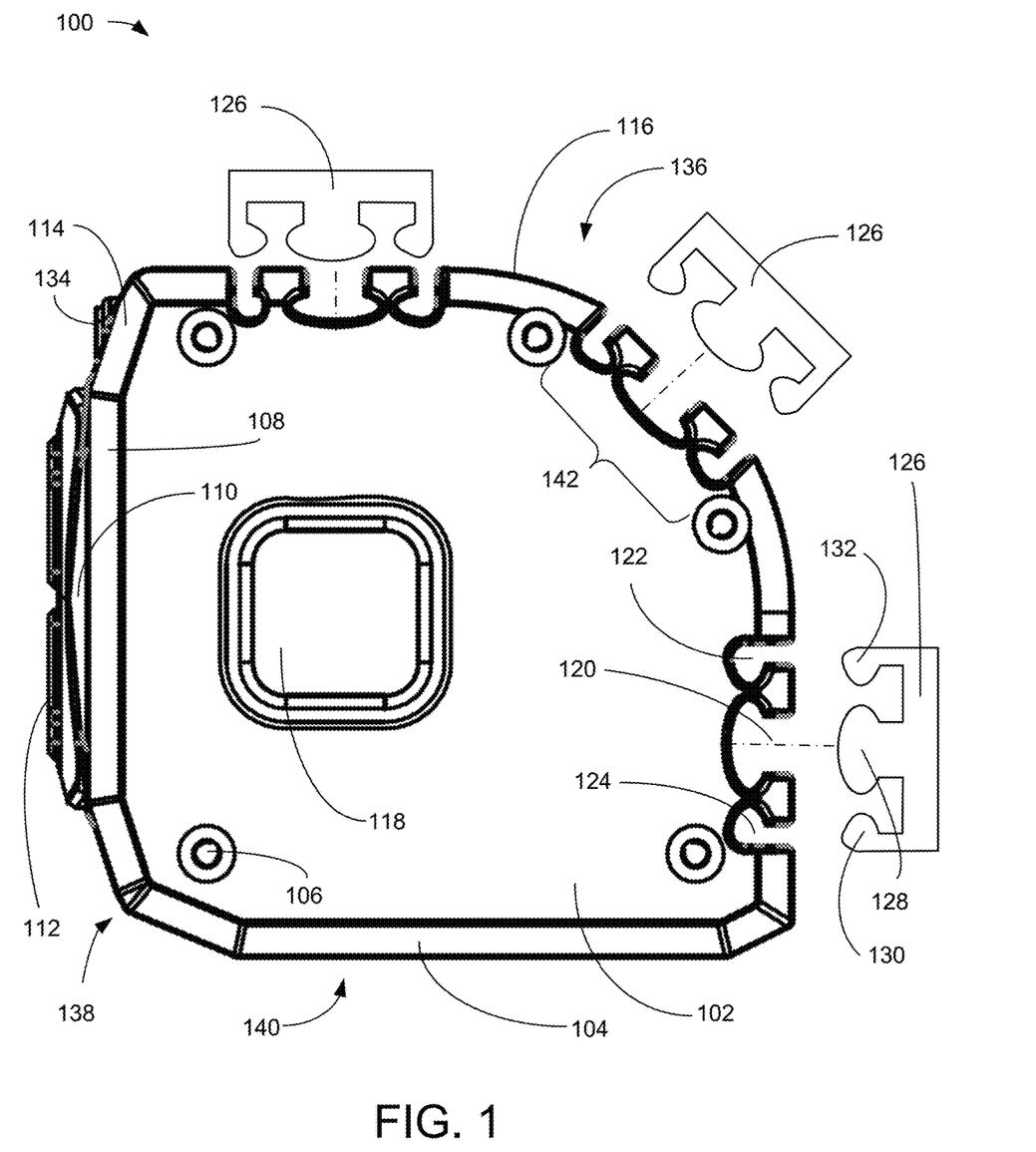
FIG. 1 is a diagrammatic end elevation view illustrating an exemplary embodiment of a sound bar system with three-legged nuts aligned to respective sets of three unique slots, according to a preferred embodiment of the present invention.

As used and defined herein, words of relative position such as "front", "bottom", etc. refer to the apparatus in the operational orientation shown in FIG. 1. As used and defined herein, the word "speaker", without more, means "loudspeaker". The hundred(s) digits of reference numbers refer to the drawing number in regard to which the referenced item is first shown and discussed.

FIG. 1 is a diagrammatic end elevation view illustrating an exemplary embodiment of a sound bar system 100 with three-legged nuts 126 aligned to respective sets 142 (one of three labeled) of three mutually unique parallel spaced-apart slots 120, 122, 124, according to a preferred embodiment of the present invention. Sound bar system 100 includes housing 140 having a front frame 108 that supports faceted front foraminous speaker grill 110 and admits protrusion of control panel 112. Control panel 112 extends through a corresponding opening in the faceted front foraminous speaker grill 110. Top front panel 114 is inclined rearward from front frame 108 and supports LED light bar 134. Angled frame section 138 extends from the bottom of front frame 108 to flat rectangular bottom frame 104 that supports a second, bottom foraminous, speaker grill 1602 (see FIG. 16). In various other embodiments, correspondingly various designs of speaker grills 110 and 1602 may be used.

Arcuate housing wall 136 extends from the top of top front panel 114 to the rear edge of flat rectangular bottom frame 104 and has segmented surface portions 116 (one of eleven labeled) separated by three sets 142 (one of three labeled) of mutually unique parallel spaced-apart slots 120, 122, and 124 (one each of three each labeled). In various embodiments, other pluralities of sets 142 of mutually unique parallel spaced-apart slots 120, 122, and 124 may be used. First end panel 102 is fastened to internal flanges of front frame 108, angled frame section 138, flat rectangular bottom frame 104, and arcuate housing wall 136 with fasteners 106 (one of five labeled) such as, for non-limiting examples, screws, rivets, or bolts. Anti-rotation socket 118, illustrated as square socket 118, in first end panel 102 receives but does not couple square bolt head 1118 (see FIG. 11), as will be discussed further below. In some embodiments, more than three sets 142 of mutually unique parallel spaced-apart slots 120, 122, and 124 may be used.

Three-legged nuts 126 each have three mutually unique parallel spaced-apart legs 128, 130, and 132 that conformally correspond to mutually unique parallel spaced-apart slots 120, 122, and 124, respectively. Three-legged nuts 126 are preferably made of a material of similar hardness and elasticity to the housing material. For non-limiting examples, a hard plastic, composite material, or metal may be used.

Figure 2:
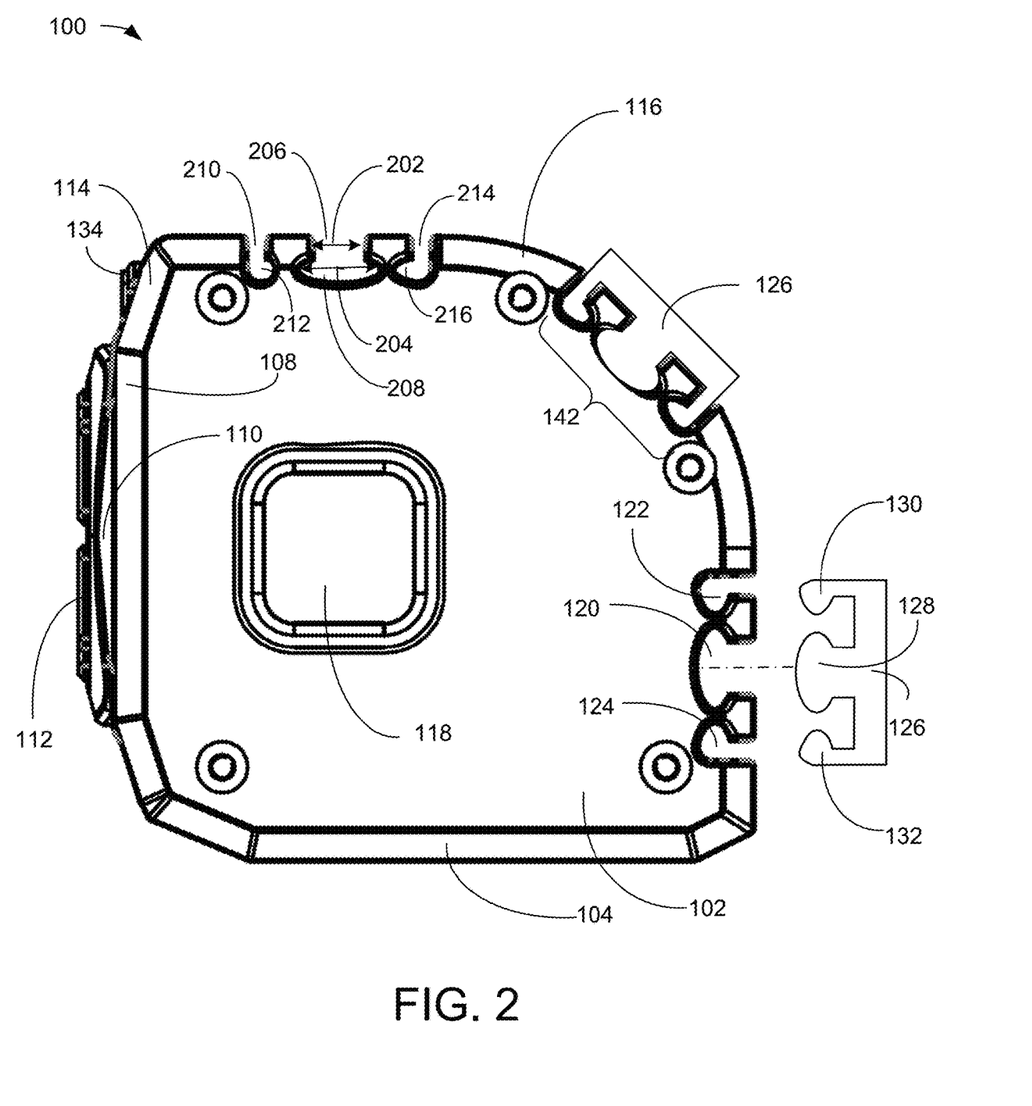
FIG. 2 is a diagrammatic view illustrating an exemplary embodiment of the sound bar system of FIG. 1 showing a three-legged nut slidingly received in a set of slots, according to a preferred embodiment of the present invention.

FIG. 2 is a diagrammatic view illustrating an exemplary embodiment of the sound bar system 100 of FIG. 1 showing a three-legged nut 126 slidingly received in a set 142 of mutually unique parallel spaced-apart slots 120, 122, and 124, according to a preferred embodiment of the present invention. Three-legged nut 126 has a central leg 128, a first side leg 130, and a second side leg 132, each of which is shaped to conformally correspond to mutually unique parallel spaced-apart slots 120, 122, and 124, respectively. Multiple three-legged nuts 126 may be engaged in one set 142 of mutually unique parallel spaced-apart slots 120, 122, and 124. In some embodiments, two or three sets 142 of mutually unique parallel spaced-apart slots 120, 122, and 124 may engage three-legged nuts 126 for the same installation. This enables installation of sound bar system 100 on irregular supports, and is a novel aspect of the present invention. Central slot 120 has an expanded lower cross section 208 with a narrower rectangular throat 206 having a throat width 202 that is smaller than the width 204 of the expanded lower cross section 208 of central slot 120. First side slot 122 on a first side of said central slot 120 has a rectangular throat 210 and an expanded lower cross section 212 extending toward said central slot 120. Second side slot 124 on a second opposed side of said central slot 120 has a rectangular throat 214 and an expanded lower cross section 216 extending toward said central slot 120. The cross-sectional shapes of mutually unique parallel spaced-apart slots 120, 122, and 124 are merely exemplary. Those of skill in the art, enlightened by the present disclosure, will appreciate the various shapes that may serve as mutually unique parallel spaced-apart slots 120, 122, and 124.

Figure 3:
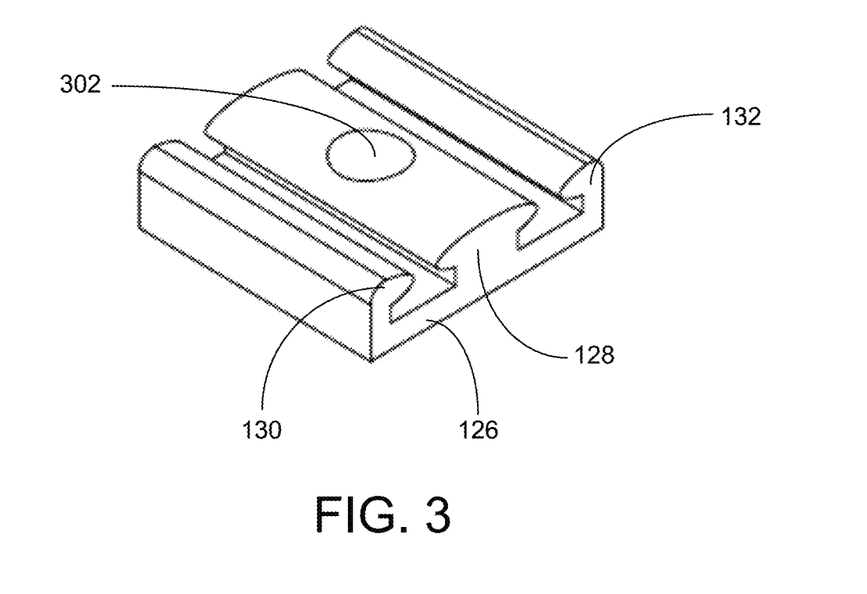
FIG. 3 is a bottom perspective view illustrating an exemplary embodiment of the three-legged nut of the sound bar system of FIG. 1, according to a preferred embodiment of the present invention.

FIG. 3 is a bottom perspective view illustrating an exemplary embodiment of the three-legged nut 126 of the sound bar system 100 of FIG. 1, according to a preferred embodiment of the present invention. Threaded bore 302 extends through the central leg 128 of three-legged nut 126. Those of skill in the art, enlightened by the present disclosure, will appreciate the various ways that multi-legged nuts 126 may be varied within the scope of the present invention. For non-limiting example, a two-legged nut with outwardly turned legs for mutually unique parallel spaced-apart side slots 122 and 124 and that extends across housing segmented surface portion labeled 116 may suffice. Mutually unique parallel spaced-apart slots 120, 122, and 124 extend parallel to the long axis of the sound bar system 100. In another embodiment, multiple sets of mutually unique parallel spaced-apart slots 120, 122, and 124 may extend arcuately along arcuate housing wall 136, transverse to the long axis of the sound bar system 100, and the mutually unique parallel spaced-apart legs 128, 130, and 132 of three-legged nut 126 may be made correspondingly arcuate along their length to enable sliding engagement of mutually unique parallel spaced-apart slots 120, 122, and 124.

Figure 4:
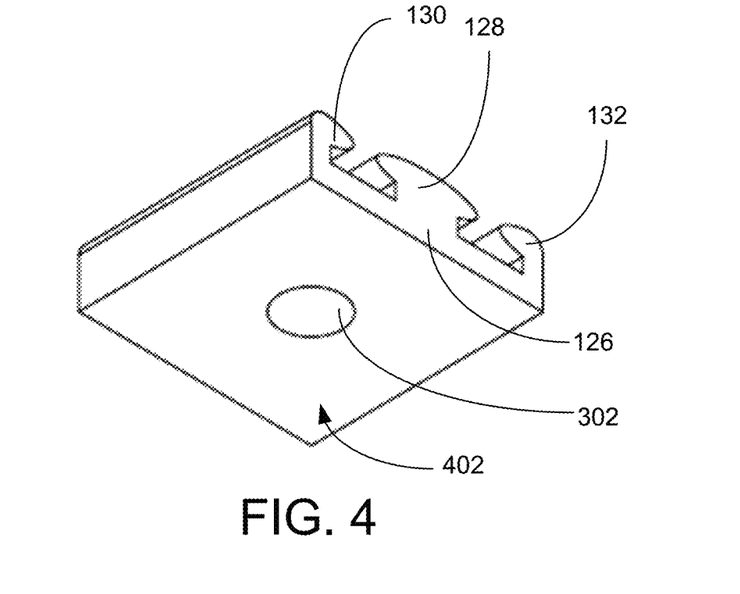
FIG. 4 is a top perspective view illustrating an exemplary embodiment of the three-legged nut of the sound bar system of FIG. 1, according to a preferred embodiment of the present invention.

FIG. 4 is a top perspective view illustrating an exemplary embodiment of the three-legged nut 126 of the sound bar system 100 of FIG. 1, according to a preferred embodiment of the present invention. Threaded bore 302 extends through the middle leg 128 of three-legged nut 126, preferably to the center of top surface 402 of three-legged nut 126. Top surface 402 is preferably flat, as shown, to mount to a flat mounting surface, such as, without limitation, the bottom of a shelf or clamp 516 (see FIG. 5). In other embodiments, top surfaces 402 may be contoured to match respective particular mounting surfaces.

Figure 5:
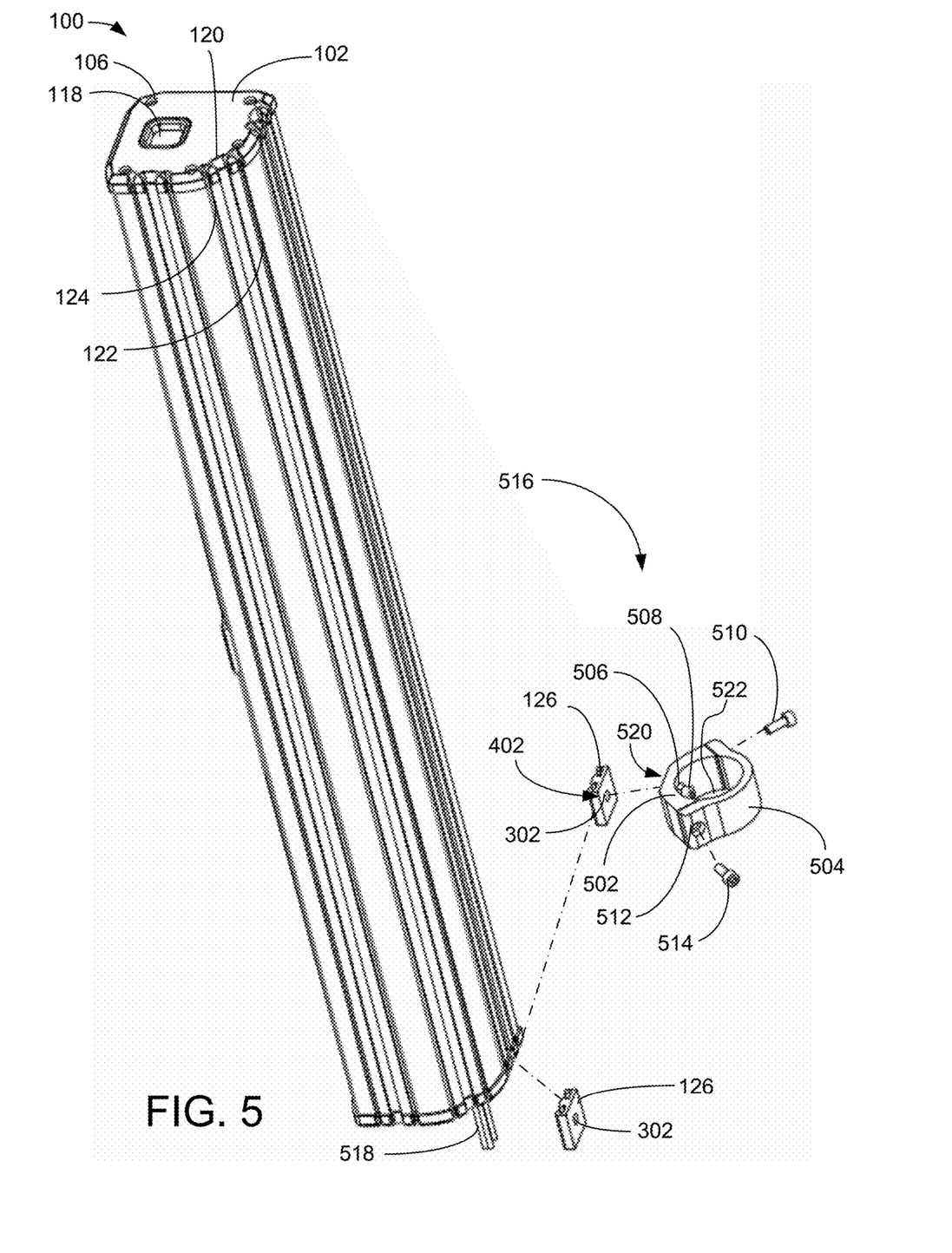
FIG. 5 is a side perspective exploded view illustrating an exemplary embodiment of a clamp connectable to the sound bar system of FIG. 1, according to a preferred embodiment of the present invention.

FIG. 5 is a side perspective exploded view illustrating an exemplary embodiment of a clamp 516 connectable to the sound bar system 100 of FIG. 1, according to a preferred embodiment of the present invention. Clamp 516 has a bottom portion 502 and a top portion 504 that can be clamped around a mounting support such as, for non-limiting examples, a pipe or rod. In various embodiments, clamp 516 may have respectively various shapes of openings 522 for engaging respectively various mounting supports. Bottom portion 502 has a bottom surface 520 that abuts top surface 402 of three-legged nut 126, when assembled. A bore 506 through the bottom portion 502 conducts a fastener 508, illustrated as bolt 508, through the bore 506 and into threaded bore 308 of three-legged nut 126 to fasten bottom portion 502 to three-legged nut 126. Three-legged nut 126 is then slidingly engaged in mutually unique parallel spaced-apart slots 120, 122, and 124, positioned therein, and the bolt 508 is further tightened to fasten the nut in place. Next, the bottom portion 502 is engaged to the mounting support, the top portion 504 is aligned over the mounting support and is fastened to the bottom portion 502 using fasteners 510 and 514 through fastener openings 512

(one visible of two labeled). Audio, control, and power cables 518 provide power and signals to operate the sound bar system 100.

Figures 6, 7:
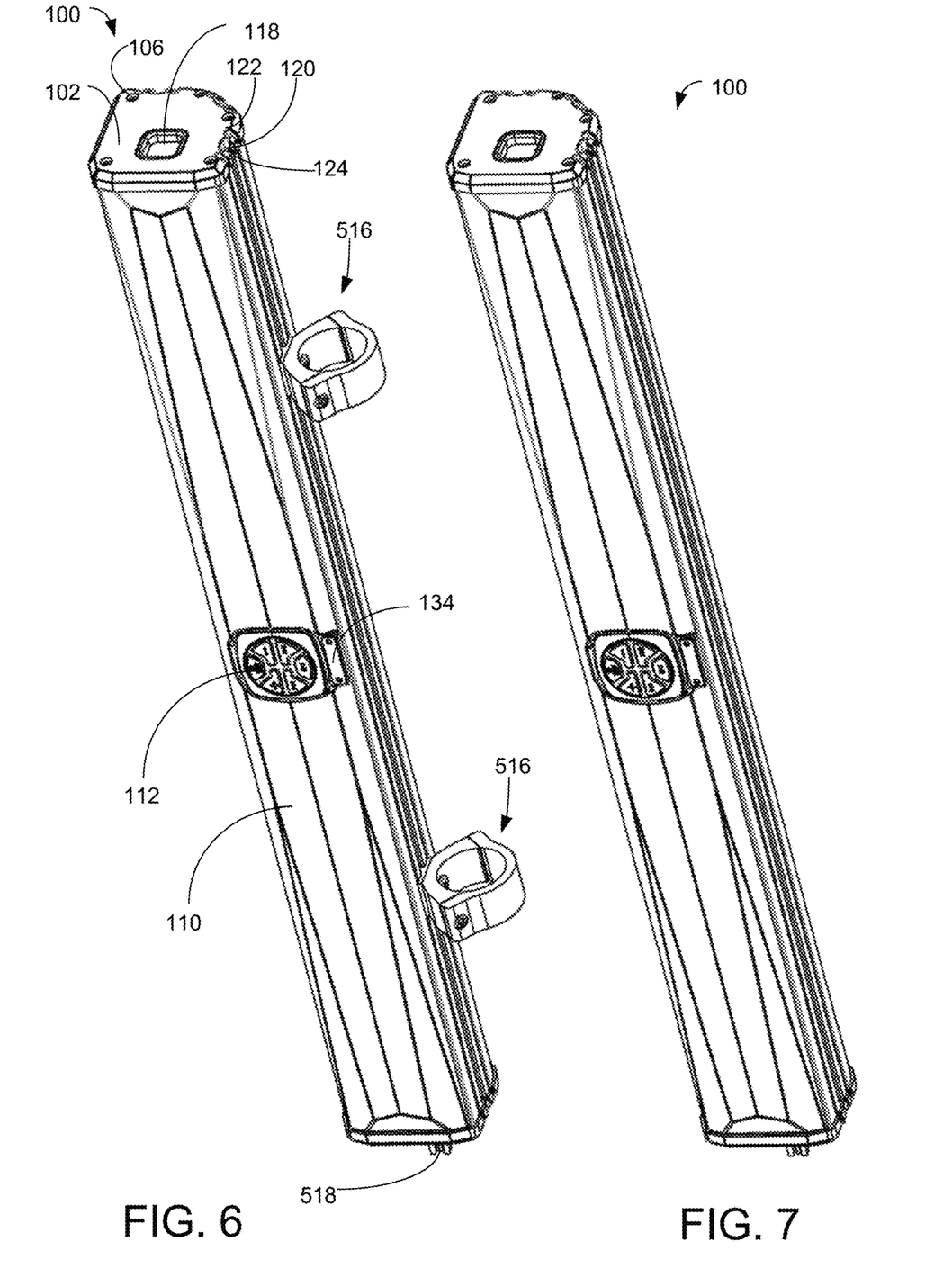
FIG. 6 is a side perspective view illustrating the exemplary embodiment of the clamp of FIG. 5 connected to the sound bar system of FIG. 1, according to a preferred embodiment of the present invention.
FIG. 7 is a side perspective view illustrating the sound bar system of FIG. 1, according to a preferred embodiment of the present invention.

FIG. 6 is a side perspective view illustrating the exemplary embodiment of the clamp 516 of FIG. 5 connected to the sound bar system 100 of FIG. 1, according to a preferred embodiment of the present invention. Clamps 516 are shown in the same set of mutually unique parallel spaced-apart slots 120, 122, and 124, but this is not a limitation of the invention. Likewise, showing the clamps 516 in the same particular set 142 of mutually unique parallel spaced-apart slots 120, 122, and 124 is not a limitation of the invention. The clamps 516 have 360° of rotational freedom about fastener 508 and need not be aligned to each other. This, combined with the ability to use two or three sets 142 of mutually unique parallel spaced-apart slots 120, 122, and 124 gives the present invention excellent installation adaptability.

FIG. 7 is a side perspective view illustrating the sound bar system 100 of FIG. 1, according to a preferred embodiment of the present invention. FIG. 7 is provided for comparison with FIG. 6.

Figures 8, 9:
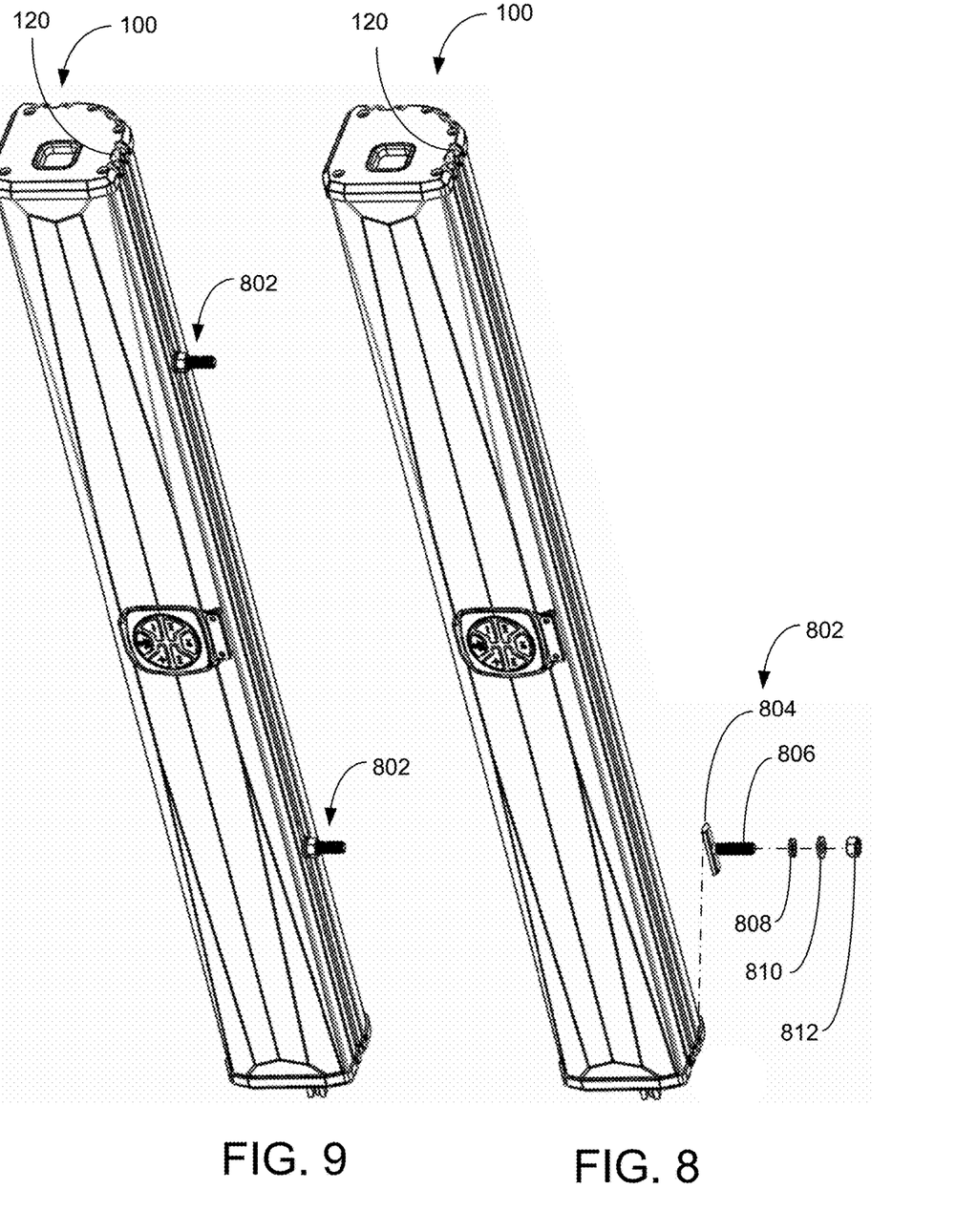
FIG. 8 is a side perspective exploded view illustrating an exemplary embodiment of a single-legged slider coupling connectable to the sound bar system of FIG. 1, according to a preferred embodiment of the present invention.
FIG. 9 is a side perspective view illustrating an exemplary embodiment of two of the single-legged slider couplings of FIG. 8 connected to the sound bar system of FIG. 1, according to a preferred embodiment of the present invention.

FIG. 8 is a side perspective exploded view illustrating an exemplary embodiment of a single-legged slider coupling 802 connectable to the sound bar system 100 of FIG. 1, according to a preferred embodiment of the present invention. Single-legged slider coupling 802 includes an elongated slider leg 804 having a cross section corresponding to central slot 120 and a threaded rod 806 extending at a right angle from the elongated slider leg 804. Threaded rod 806 has an outside diameter less than throat width 202. When single-legged slider coupling 802 is installed, washer 808 surrounds threaded rod 806 and abuts an outside surface of housing 140, followed by spring washer 810 and nut 812, as shown.

FIG. 9 is a side perspective view illustrating an exemplary embodiment of two of the single-legged slider couplings 802 of FIG. 8 connected to the sound bar system 100 of FIG. 1, according to a preferred embodiment of the present invention. Single-legged slider couplings 802 are shown in the same center slot 120, but this is not a limitation of the invention. Likewise, single-legged slider couplings 802 are shown in a particular central slot 120, but this is not a limitation of the invention.

Figure 10:
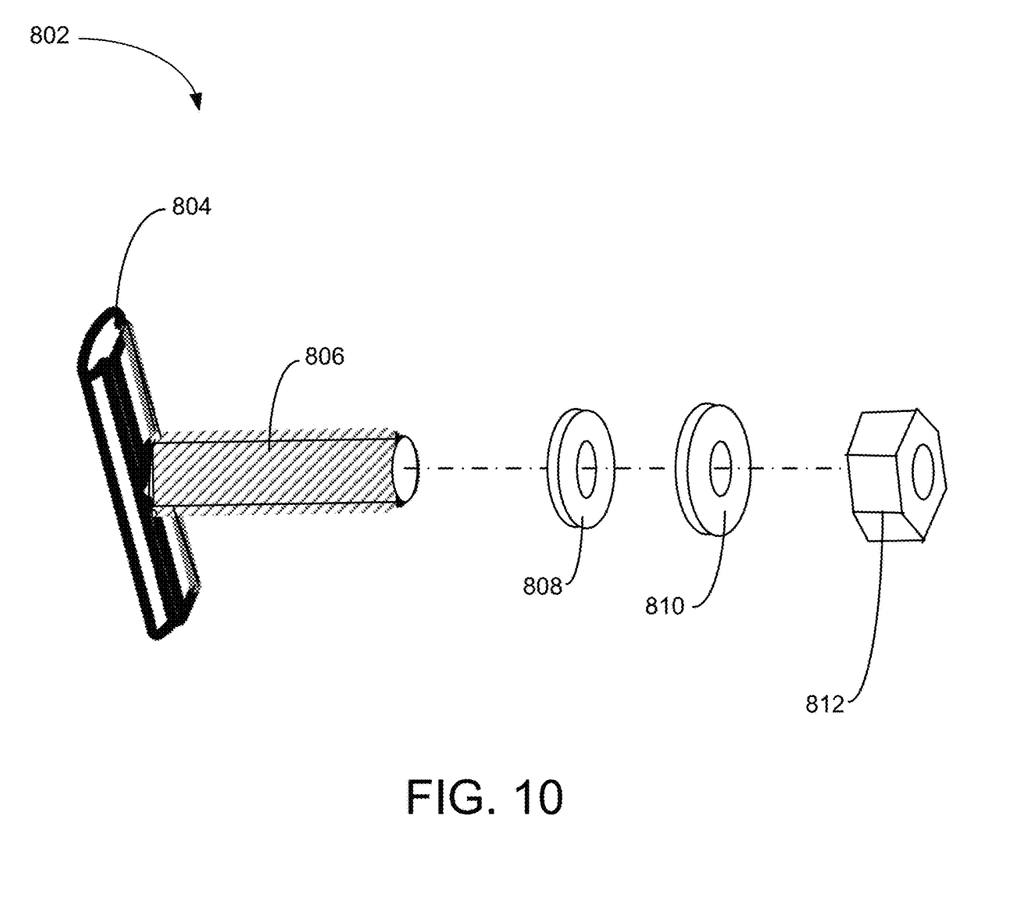
FIG. 10 is an exploded side perspective view illustrating the exemplary embodiment of the single-legged slider coupling of FIG. 8, according to a preferred embodiment of the present invention.

FIG. 10 is an exploded side perspective view illustrating the exemplary embodiment of the single-legged slider coupling 802 of FIG. 8, according to a preferred embodiment of the present invention. This enlarged view is for better illustrating the shape of the elongated slider leg 804.

Figures 11, 12:
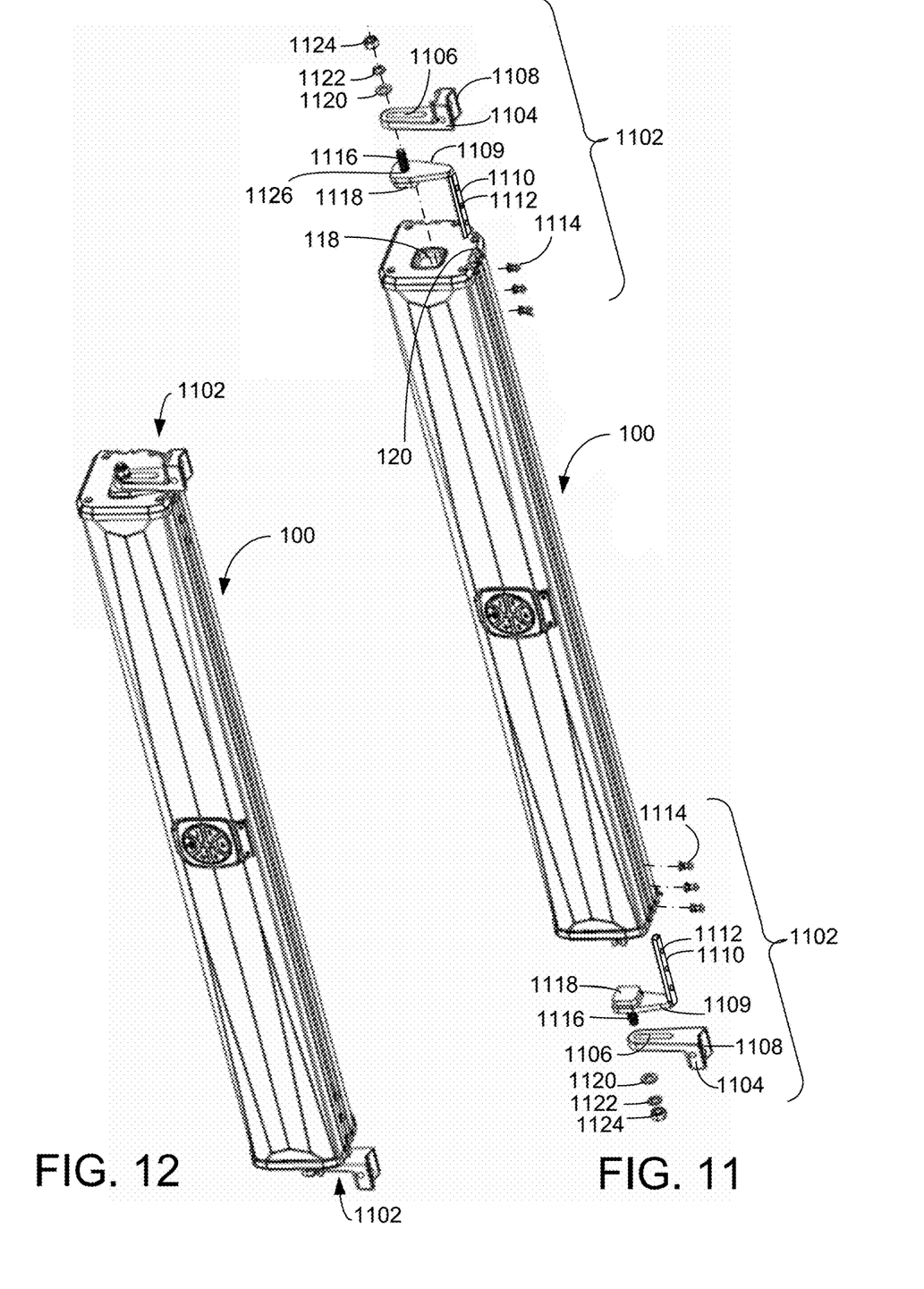
FIG. 11 is a side perspective exploded view illustrating an exemplary embodiment of first and second end couplings connectable to the sound bar system of FIG. 1, according to a preferred embodiment of the present invention.
FIG. 12 is a side perspective view illustrating the exemplary embodiment of first and second end couplings of FIG. 11 connected to the sound bar system of FIG. 1, according to a preferred embodiment of the present invention.

FIG. 11 is a side perspective exploded view illustrating an exemplary embodiment of first and second end couplings 1102 connectable to the sound bar system 100 of FIG. 1, according to a preferred embodiment of the present invention. Coupling base 1109 has a slider stem 1110 extending at right angles to the coupling base 1109 and configured to slide into central slot 120. Slider stem 1110 has a plurality of threaded holes 1112 (one of three labeled) into which screws 1114 (one of three labeled) are fastened to secure slider stem 1110 in central slot 120. Coupling base 1109 has a hole 1126 through which bolt stem 1116 extends from square bolt head 1118. Square bolt head 1118 fits non-rotationally into anti-rotation socket 118 but does not couple to anti-rotation socket 118. Bracket 1104 has a slot 1106 for adjustably positioning the bracket 1104 relative to bolt stem 1116. Bracket 1104 has an arcuate receiving surface 1108 for engaging an arcuate or flat mounting surface. At least one fastener opening through the arcuate receiving surface 1108 assists in fastening bracket 1104 to a mounting surface. Once the bracket 1104 has been adjusted in slot 1106, washer 1120, spring washer 1122, and nut 1124 are used to secure the bracket 1104 to the coupling base 1109. A novel feature of the present invention is that the end coupling 1102 is coupled to the central slot 120 in arcuate housing wall 136, and is not coupled to the first end panel 102. Bracket 1104 has 360° freedom of positioning.

FIG. 12 is a side perspective view illustrating the exemplary embodiment of first and second end couplings 1102 of FIG. 11 connected to the sound bar system 100 of FIG. 1, according to a preferred embodiment of the present invention. First and second end couplings 1102 are shown with a common orientation, as if to both engage a single straight bar. In various installations, first and second end couplings 1102 may not have identical slot 1106 adjustment positions or rotational orientations, depending on the available mounting site configurations. In a particular embodiment, arcuate housing wall 136 is shaped such that all sets 142 of mutually unique parallel spaced-apart slots 120, 122, and 124 are oriented with the centerline of central slot 120 passing through the center of square anti-rotation socket 118 and 1702 (see FIG. 17), such that any central slot 120 may be used for attaching first and second end couplings 1102.

Figure 13:
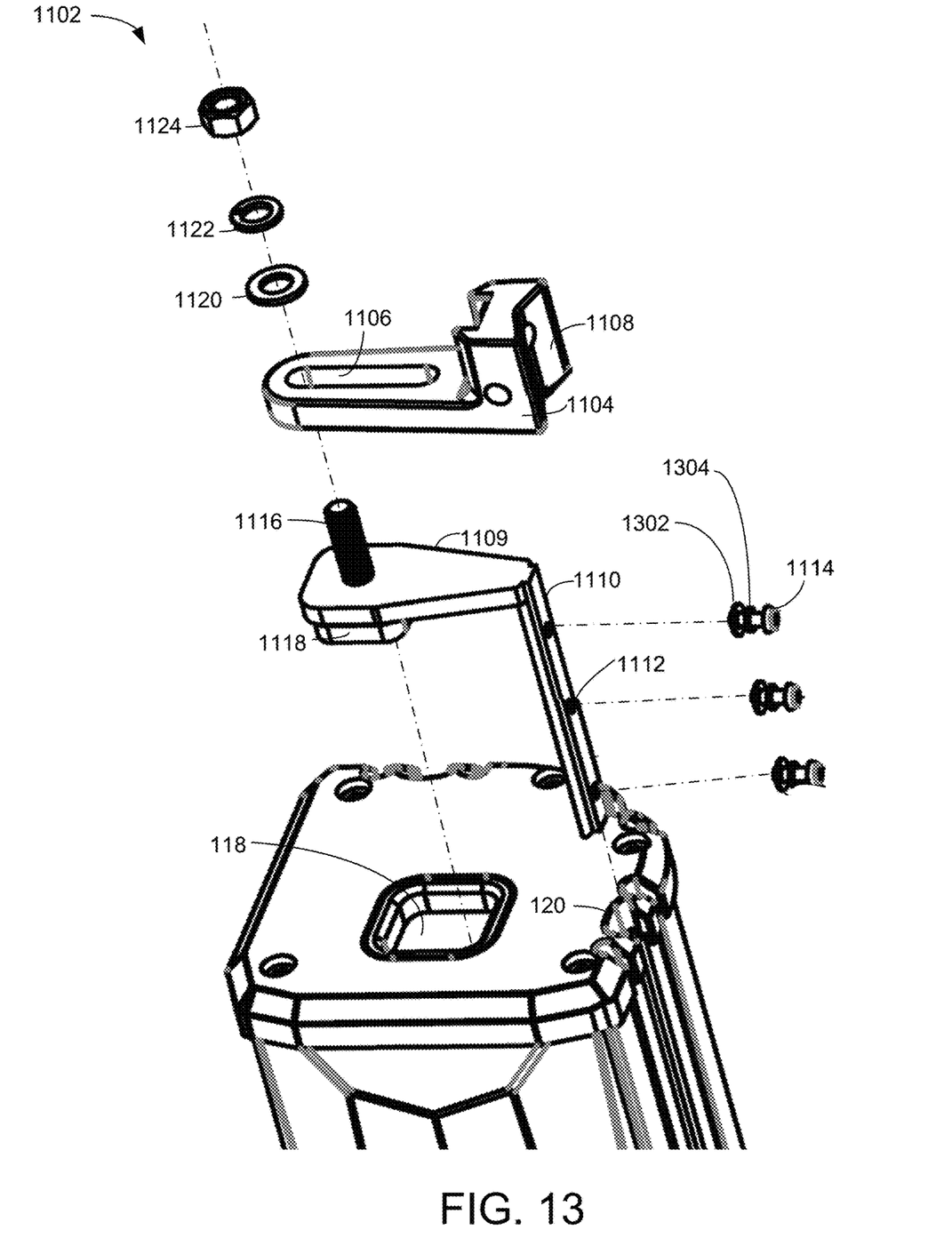
FIG. 13 is an exploded side perspective view illustrating the exemplary embodiment of the end coupling of FIG. 11, according to a preferred embodiment of the present invention.

FIG. 13 is an exploded side perspective view illustrating the exemplary embodiment of the end coupling 1102 of FIG. 11, according to a preferred embodiment of the present invention. This enlarged view shows that screws 1114 include a screw, a washer 1302 (one of three labeled) and a spring washer 1304 (one of three labeled). The outside diameter of washer 1302 is larger than the throat width 202 of central slot 120, and so washer 1302 rests on an external surface of housing 140, when installed.

Figure 14:
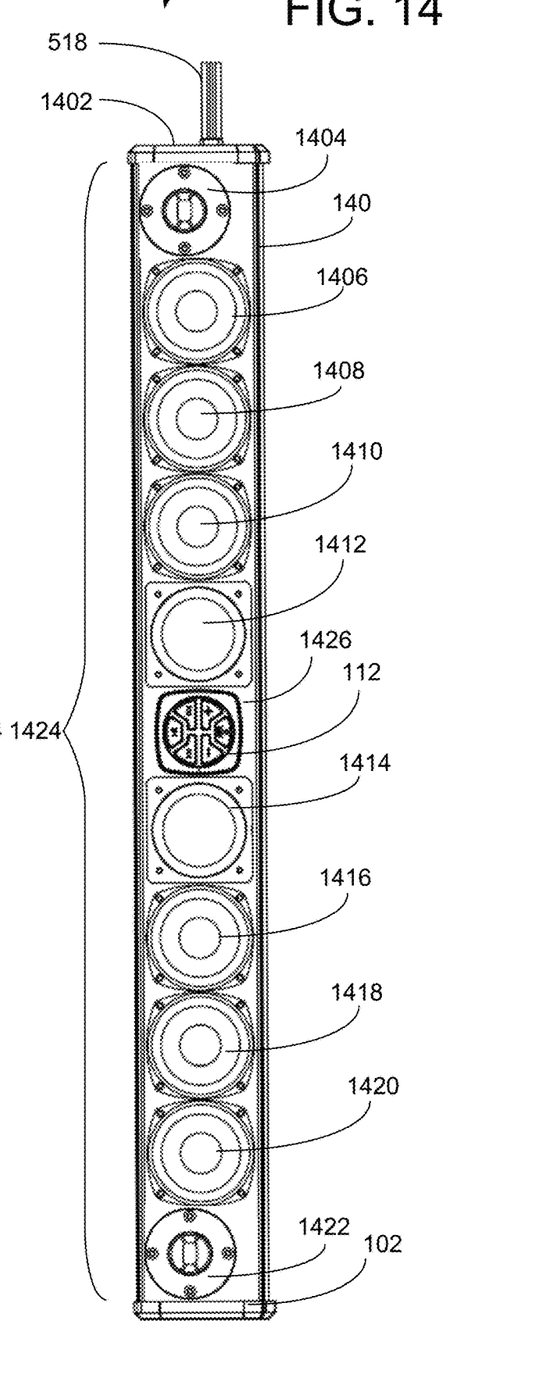
FIG. 14 is a front elevation view illustrating an exemplary embodiment of the sound bar system of FIG. 1 without a front speaker grill attached, according to a preferred embodiment of the present invention.

FIG. 14 is a front elevation view illustrating an exemplary embodiment of the sound bar system 100 of FIG. 1 without the front speaker grill 110 attached, according to a preferred embodiment of the present invention. The non-linear arrangement of speakers 1424 includes tweeter 1404; mid-range speakers 1406, 1408, and 1410; front-facing passive radiator 1412 for downwardly pointing woofer 1510 (see FIG. 15); front-facing passive radiator 1414 for downwardly pointing woofer 1512 (see FIG. 15); midrange speakers 1416, 1418, and 1420; and tweeter 1422. Front-facing passive radiators 1412 and 1414 are preferably made of aluminum to avoid magnetic interference. In other embodiments, respective other non-magnetic materials may be used for front-facing passive radiators 1412 and 1414. Control panel 112 is supported by the housing 140 and front support panel 1426 and extends through an opening of the front speaker grill 110, when front speaker grill 110 is attached. Front support panel 1426 is supported in front frame 108 and supports the non-linear arrangement of speakers 1424 via fasteners. Non-linear arrangement of speakers 1424 features off-center tweeters 1404 and 1422, rotationally out-of-line woofers 1510 and 1512, and passive radiators 1412 and 1414. In various other embodiments, respective other non-linear arrangements of speakers and passive radiators may be used.

Figure 15:
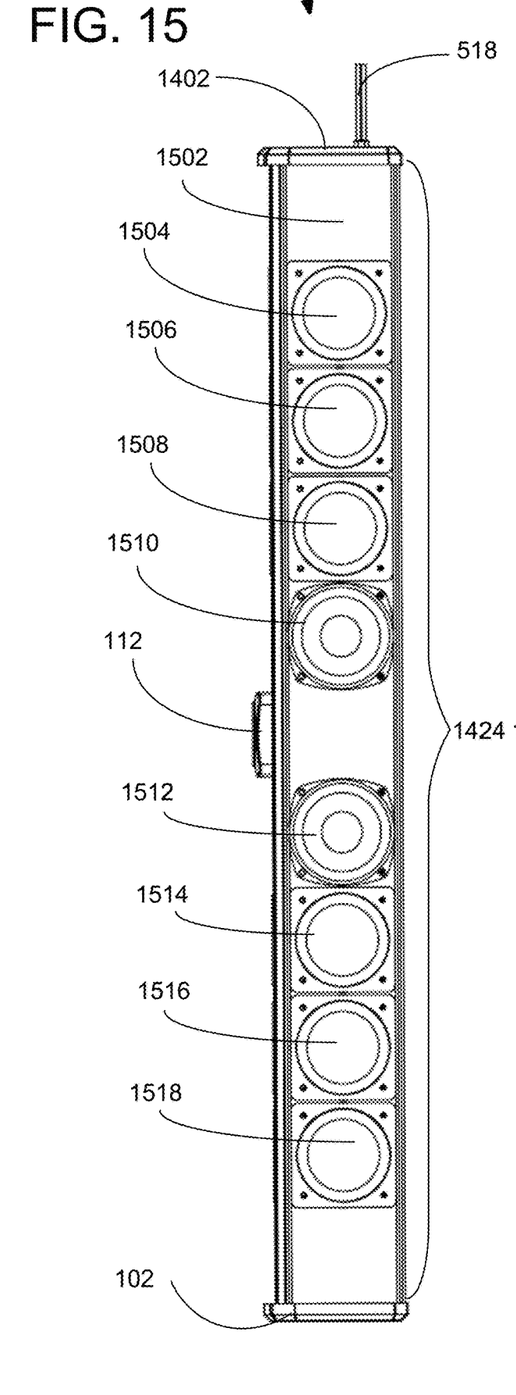
FIG. 15 is a bottom plan view illustrating an exemplary embodiment of the sound bar system of FIG. 1 without a second speaker grill attached, according to a preferred embodiment of the present invention.
Figure 16:
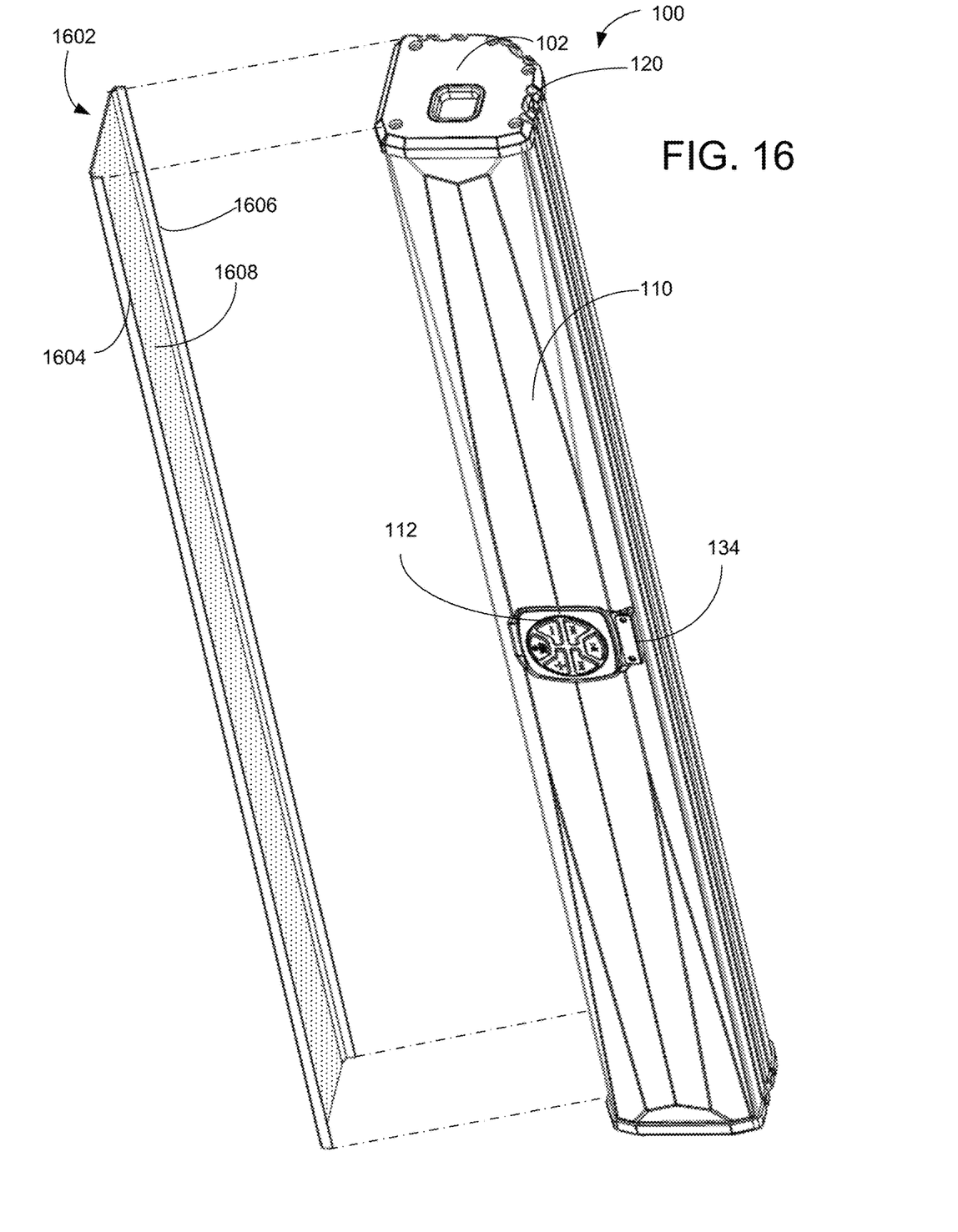
FIG. 16 is an exploded side perspective view illustrating the exemplary embodiment of the sound bar system of FIG. 1 with an exemplary embodiment of a second speaker grill, according to a preferred embodiment of the present invention.

FIG. 15 is a bottom plan view illustrating an exemplary embodiment of the sound bar system 100 of FIG. 1 without the second speaker grill 1602 attached, according to a preferred embodiment of the present invention. Bottom support panel 1502 is supported in bottom frame 104 and supports mid-range passive radiators 1504, 1506, and 1508; woofer 1510; woofer 1512; and mid-range passive radiators 1514, 1516, and 1518 of the non-linear arrangement of speakers 1424. Mid-range passive radiators 1504, 1506,

1508, 1514, 1516, and 1518 are preferably made of aluminum to avoid magnetic interference. In other embodiments, respective other non-magnetic materials may be used for mid-range passive radiators 1504, 1506, 1508, 1514, 1516, and 1518.

FIG. 16 is an exploded side perspective view illustrating the exemplary embodiment of the sound bar system 100 of FIG. 1 with an exemplary embodiment of a second speaker grill, according to a preferred embodiment of the present invention. The bottom frame 104 supports second, foraminous bottom, speaker grill 1602 having opposed flanged edges 1604 and 1606 separated by foraminous central panel 1608. In some embodiments, the entire second speaker grill 1602, including opposed flanged edges 1604 and 1606 may be foraminous. In various embodiments, correspondingly various patterns of holes may used in foraminous portions of bottom speaker grill 1602 and front speaker grill 110.

Figure 17:
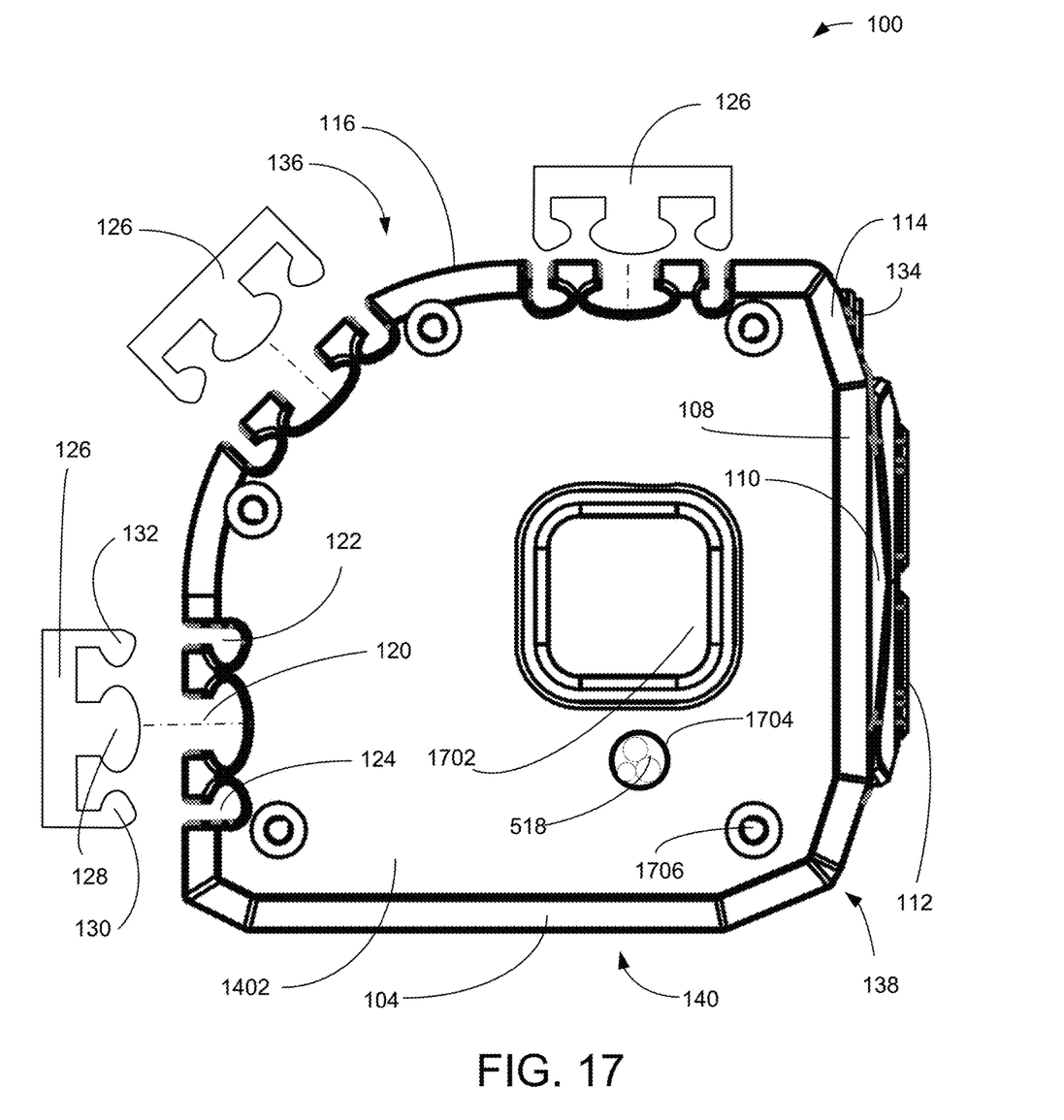
FIG. 17 is a diagrammatic end elevation view illustrating the exemplary embodiment of a sound bar system of FIG. 1 with three-legged nuts aligned to respective sets of three unique slots, according to a preferred embodiment of the present invention.

FIG. 17 is a diagrammatic end elevation view illustrating the exemplary embodiment of a sound bar system 100 of FIG. 1 with three-legged nuts 126 aligned to respective sets 142 of three mutually unique parallel spaced-apart slots 120, 122, and 124, according to a preferred embodiment of the present invention. Second end panel 1402 has an anti-rotation socket 1702, a cable opening 1704 for cable 518 and fasteners 1706 (one of five labeled). Second end panel 1402 is otherwise a mirror image of first end panel 102.

Figure 18:
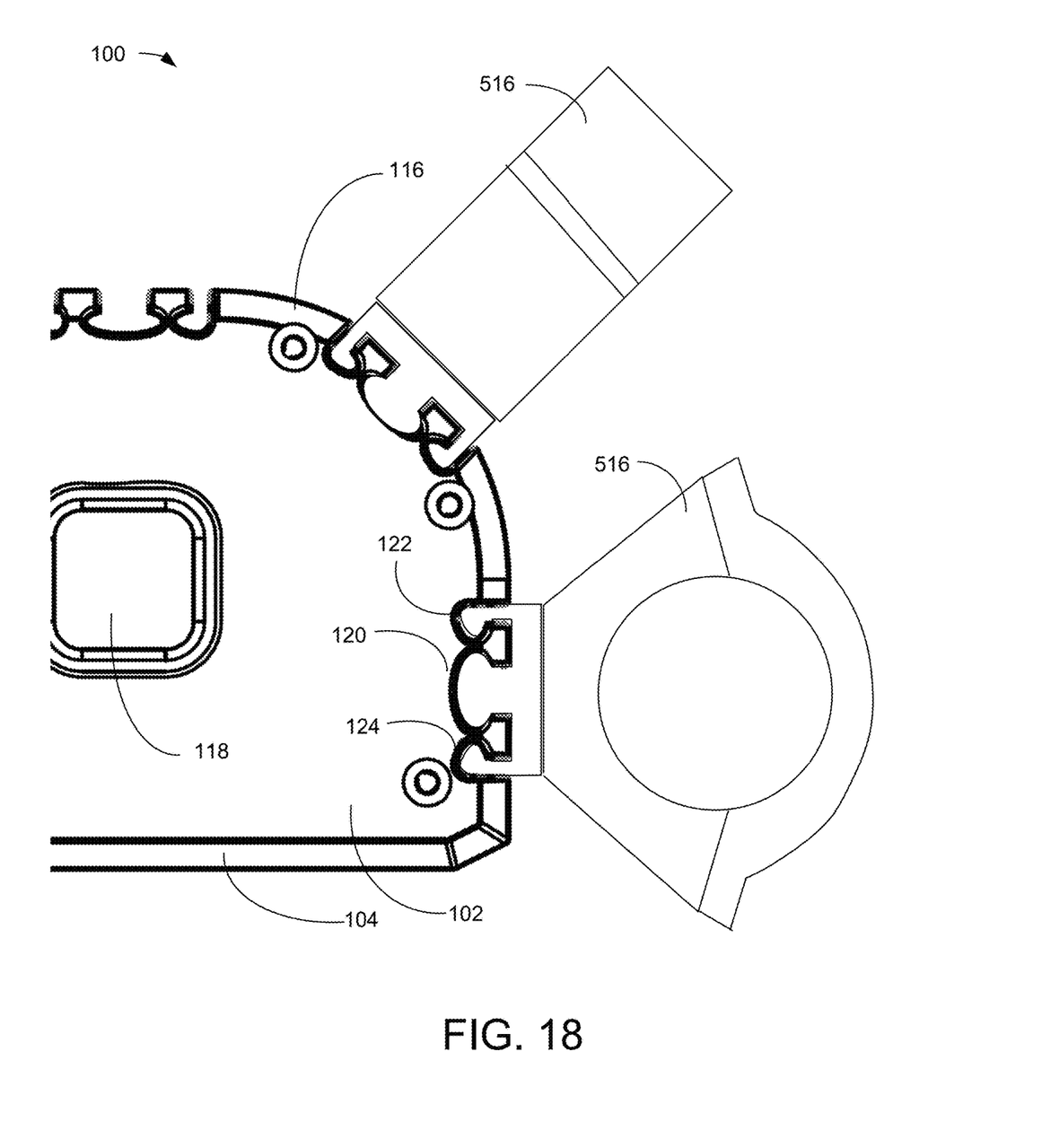
FIG. 18 is a diagrammatic end elevation view illustrating the exemplary embodiment of a sound bar system of FIG. 1 with two three-legged nuts slidingly received into two respective sets of three unique slots, according to a preferred embodiment of the present invention.

FIG. 18 is a diagrammatic end elevation view illustrating the exemplary embodiment of a sound bar system 100 of FIG. 1 with two three-legged nuts 126 slidingly received into two respective sets 142 of three mutually unique parallel spaced-apart slots 120, 122, and 124, according to a preferred embodiment of the present invention. First and second clamps 516 are installed in respective first and second sets 142 of mutually unique parallel spaced-apart slots 120, 122, and 124. First and second clamps 516 are installed at different orientations; in different sets 142 of mutually unique parallel spaced-apart slots 120, 122, and 124; and in different longitudinal locations along the sound bar system 100. FIG. 18 shows one example of the flexibility of the sound bar system 100 in adapting to various mounting challenges. Combinations of any number of up to three types of couplings (clamps 516, single-legged slider couplings 802, and end couplings 1102) may be used together to mount the sound bar system 100. Any or all of the sets 142 of mutually unique parallel spaced-apart slots 120, 122, and 124 may be used to mount the sound bar system 100.

The following claims may contain functional claim language and do not contain statements of intended use.

We claim:

1. A sound bar system comprising a sound bar further comprising:
   a. a housing having:
      i. a flat rectangular bottom frame;
      ii. a front rectangular frame extending upward from an angled frame section extending from a front portion of said flat rectangular bottom frame; and
      iii. an arcuate housing wall extending from a top portion of said front rectangular frame to a rear portion of said flat rectangular bottom frame;
   b. an arrangement of loudspeakers within said housing;
   c. a plurality of sets of three mutually unique parallel spaced-apart slots in said arcuate housing wall;
   d. wherein said three mutually unique parallel slots comprise:
      i. a central slot having an expanded lower cross section with a narrower rectangular throat;
      ii. a first side slot spaced apart from a first side of said central slot having a rectangular throat and an expanded lower cross section extending toward said central slot; and
      iii. a second side slot spaced apart from a second opposed side of said central slot having a rectangular throat and an expanded lower cross section extending toward said central slot.

2. The sound bar system of claim 1, comprising at least one three-legged nut having:
   a. three legs shaped conformally to said three mutually unique parallel spaced-apart slots;
   b. a top surface shaped conformally to a mounting surface to be engaged; and
   c. a threaded bore through said top surface and through a central leg of said three legs.

3. The sound bar system of claim 2, comprising a clamp having:
   a. a bottom portion having:
      i. a bottom surface conformal to said top surface of said three-legged nut;
      ii. a hole through said bottom portion of said clamp, through said bottom surface of said bottom portion of said clamp, and alignable to said threaded bore of said three-legged nut;
      iii. a threaded fastener receivable in said hole and into said threaded bore;
      iv. first and second fastener openings at opposed first and second ends of said bottom portion of said clamp;
   b. a top portion having third and fourth fastener openings at opposed first and second ends of said top portion alignable to said first and second fastener openings, respectively; and
   c. wherein interior surfaces of said bottom and top portions of said clamp define a cross sectional shape of a mounting support for receiving said clamp, when installed.

4. The sound bar system of claim 3, wherein said clamp has 360 degrees of rotational freedom when being installed.

5. The sound bar system of claim 1, comprising a single-legged slider coupling having:
   a. an elongated slider leg having a cross sectional shape corresponding to a lower expansion of a slot of said three mutually unique parallel spaced-apart slots; and
   b. a threaded stem extending transversely from said elongated slider leg.

6. The sound bar system of claim 1, comprising;
   a. first and second end panels closing respective first and second ends of said sound bar; and
   b. first and second anti-rotation sockets in respective first and second end panels.

7. The sound bar system of claim 6, comprising first and second end couplings adapted to be coupled to respective opposed ends of said arcuate housing wall.

8. The sound bar system of claim 7, wherein each said end coupling of said first and second end couplings comprises:
   a. a coupling base plate having:
      i. a bore through said coupling base plate adapted to receive a bolt with an anti-rotational head shaped corresponding to said anti-rotational socket;
      ii. a slider stem:
         1. extending transversely from said bracket base plate;
         2. having a cross section corresponding to a slot of said three mutually unique parallel spaced-apart slots;

3. having a plurality of threaded bores transverse to said slider stem; and
4. having an equal said plurality of threaded fasteners;
b. a bracket having:
i. an adjustment slot for receiving a threaded stem of said bolt;
ii. a receiving surface shaped conformally to a mounting surface to be engaged; and
iii. a fastener opening through said receiving surface; and
c. hardware for securing said bolt.

9. The sound bar system of claim 1, comprising:
a. a first foraminous front grill attachable to said front frame;
b. a second foraminous grill attachable to said bottom frame;
c. a first plurality of passive radiators attachable to a bottom support panel supported by said bottom frame;
d. a second plurality of passive radiators attachable to a front support panel supported by said front frame;
e. a control panel attachable to said front frame and said front support panel; and
f. an LED light panel attachable to said front frame.

10. A sound bar system comprising a sound bar further comprising:
a. a housing having:
i. a flat rectangular bottom frame;
ii. a front rectangular frame extending upward from an angled frame section extending from a front portion of said flat rectangular bottom frame; and
iii. an arcuate housing wall extending from a top portion of said front rectangular frame to a rear portion of said flat rectangular bottom frame;
b. a non-linear arrangement of loudspeakers within said housing;
c. a plurality of sets of three mutually unique parallel spaced-apart slots in said arcuate housing wall; and
d. at least one three-legged nut having:
i. three legs shaped conformally to said three mutually unique spaced-apart parallel slots;
ii. a top surface shaped conformally to a surface to be engaged; and
iii. a threaded bore through said top surface and through a central leg of said three legs.

11. The sound bar system of claim 10, wherein said three mutually unique parallel spaced-apart slots comprise:
a. a central slot having an expanded lower cross section with a narrower rectangular throat;
b. a first side slot spaced apart from a first side of said central slot having a rectangular throat and an expanded lower cross section extending toward said central slot; and
c. a second side slot spaced apart from a second opposed side of said central slot having a rectangular throat and an expanded lower cross section extending toward said central slot.

12. The sound bar system of claim 10, comprising a clamp having:
a. a bottom portion having:
i. a bottom surface conformal to said top surface of said three-legged nut;
ii. a hole through said bottom portion of said clamp, through said bottom surface of said bottom portion of said clamp, and alignable to said threaded bore of said three-legged nut;
iii. a threaded fastener receivable in said hole and into said threaded bore;
iv. first and second fastener openings at opposed first and second ends of said bottom portion of said clamp;
b. a top portion having third and fourth fastener openings at opposed first and second ends of said top portion alignable to said first and second fastener openings, respectively;
c. wherein interior surfaces of said bottom and top portions of said clamp define a cross sectional shape of a support for receiving said clamp, when installed; and
d. wherein said clamp has 360 degrees of rotational freedom when being installed.

13. The sound bar system of claim 11, comprising a single-legged slider coupling having:
a. an elongated slider leg having a cross sectional shape corresponding to said expanded lower cross section of a slot of said three mutually unique parallel spaced-apart slots; and
b. a threaded stem extending transversely from said elongated slider leg.

14. The sound bar system of claim 10, comprising
a. first and second end couplings adapted to be coupled to respective opposed ends of said arcuate housing wall; and
b. wherein each said end coupling of said first and second end couplings comprises:
i. a coupling base plate having:
1. a bore through said coupling base plate adapted to receive a bolt with an anti-rotational head shaped corresponding to said anti-rotational socket;
2. a slider stem:
a. extending transversely from said coupling base plate;
b. having a cross section corresponding to a slot of said three mutually unique parallel spaced-apart slots;
c. having a plurality of threaded bores transverse to said slider stem; and
d. having an equal said plurality of threaded fasteners;
ii. a bracket having:
1. an adjustment slot for receiving a threaded stem of said bolt;
2. a receiving surface shaped conformally to a mounting surface to be engaged; and
3. a fastener opening through said receiving surface; and
iii. hardware for securing said bolt.

15. The sound bar system of claim 10, comprising:
a. a first foraminous front grill attachable to said front frame;
b. a second foraminous grill attachable to said bottom frame;
c. a first plurality of passive radiators attachable to a bottom support panel supported by said bottom frame;
d. a second plurality of passive radiators attachable to a front support panel supported by said front frame;
e. a control panel attachable to said front frame and said front support panel; and
f. an LED light panel attachable to said front frame.

16. A sound bar system comprising a sound bar further comprising:
a. a housing having:
i. a flat rectangular bottom frame;

ii. a front rectangular frame extending upward from an angled frame section extending from a front portion of said flat rectangular bottom frame; and
iii. an arcuate housing wall extending from a top portion of said front rectangular frame to a rear portion of said flat rectangular bottom frame;
b. a non-linear arrangement of loudspeakers within said housing;
c. a plurality of sets of three mutually unique parallel spaced-apart slots in said arcuate housing wall;
d. wherein said three mutually unique parallel spaced-apart slots comprise:
  i. a central slot having an expanded lower cross section with a narrower rectangular throat;
  ii. a first side slot spaced apart from a first side of said central slot having a rectangular throat and an expanded lower cross section extending toward said central slot; and
  iii. a second side slot spaced apart from a second opposed side of said central slot having a rectangular throat and an expanded lower cross section extending toward said central slot;
e. a first foraminous front grill attachable to said front frame;
f. a second foraminous grill attachable to said bottom frame;
g. a first plurality of passive radiators attachable to a bottom support panel supported by said bottom frame;
h. a second plurality of passive radiators attachable to a front support panel supported by said front frame;
i. a control panel attachable to said front frame and said front support panel; and
j. an LED light panel attachable to said front frame.

17. The sound bar system of claim 16, comprising at least one of:
a. a clamp having:
  i. a bottom portion having:
    1. a bottom surface conformal to said top surface of said three-legged nut;
    2. a hole through said bottom portion of said clamp, through said bottom surface of said bottom portion of said clamp, and alignable to said threaded bore of said three-legged nut;
    3. a threaded fastener receivable in said hole and into said threaded bore;
    4. first and second fastener openings at opposed first and second ends of said bottom portion of said clamp;
  ii. a top portion having third and fourth fastener openings at opposed first and second ends of said top portion alignable to said first and second fastener openings, respectively;
  iii. wherein interior surfaces of said bottom and top portions of said clamp define a cross sectional shape of a mounting support for receiving said clamp, when installed; and
  iv. wherein said clamp has 360 degrees of rotational freedom when being installed;
b. a single-legged slider coupling having:
  i. an elongated slider leg having a cross sectional shape corresponding to said expanded lower cross section of a slot of said three unique parallel spaced-apart slots; and
  ii. a threaded stem extending transversely from said elongated slider leg; and
c. first and second end couplings adapted to be coupled to respective opposed ends of said arcuate housing wall; and
  i. wherein each said end coupling of said first and second end couplings comprises:
    1. a coupling base plate having:
      a. a bore through said coupling base plate adapted to receive a bolt with an anti-rotational head shaped corresponding to said anti-rotational socket;
      b. a slider stem:
        i. extending transversely from said coupling base plate;
        ii. having a cross section corresponding to a slot of said three mutually unique parallel spaced-apart slots;
        iii. having a plurality of threaded bores transverse to said slider stem; and
        iv. having an equal said plurality of threaded fasteners; and
    2. a bracket having:
      a. an adjustment slot for receiving a threaded stem of said bolt;
      b. a receiving surface shaped conformally to a mounting surface to be engaged; and
      c. a fastener opening through said receiving surface; and
      d. hardware for securing said bolt.

\* \* \* \* \*